Dec. 14, 1943.  F. SPORTOLARI  2,336,649
APPARATUS FOR FORMING COATED FROZEN CONFECTIONS
Original Filed May 6, 1941

INVENTOR
Frank Sportolari
BY William B. Jaspert
ATTORNEY

UNITED STATES PATENT OFFICE 2,336,649

APPARATUS FOR FORMING COATED FROZEN CONFECTIONS

Frank Sportolari, Pittsburgh, Pa.

Original application May 6, 1941, Serial No. 392,083. Divided and this application May 8, 1942, Serial No. 442,162

3 Claims. (Cl. 224—48)

This invention relates to new and useful improvements in apparatus for making frozen confections, and more particularly for filling and coating edible ice cream cones.

It is among the objects of the invention to provide an improved handling device used in making a plurality of chocolate coated cones simultaneously in an expedient and economical manner, and with complete sanitation, as it eliminates the need for handling the individual cones.

A further and more specific object of the invention is the provision of improved apparatus for handling the cones for dipping and coating operations.

Frozen confections of the type herein referred to have heretofore been produced by handling each cone individually. By the hand method the cone was filled with the substance to be frozen and charged in racks which were placed in a freezing room. After freezing they were partially dipped in a coating solution and then rolled in grated nuts or the like. Because of the time lost in handling the cones to fill them and transfer them to a freezing chamber, it was necessary to coat the inside and outside of the cone with a chocolate coating containing a fatty substance to render the cone moisture-repellent, to prevent its becoming soggy after the substance to be frozen is placed therein. Such pre-coating is not necessary when the device of the present invention is used in carrying out the hereinafter disclosed method because of the rapidity of filling, freezing and transferring the filled cones.

The invention will become more apparent from a consideration of the accompanying drawing constituting a part hereof, in which like reference characters designate like parts, and in which.

The confection handling device or holder H of the present invention comprises a body portion 23 having apertured cone holding sockets or supports 24 secured thereto at suitably spaced intervals corresponding to any desired spacing such as that employed in the mold M and the impaler A disclosed in my application for patent hereinafter mentioned.

Figure 3:
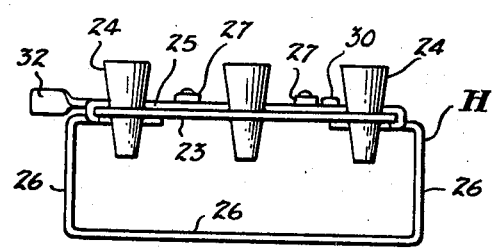
Fig. 3 is an end elevational view of the cone gripping device or rack.

A plurality of crossbars 25 are mounted on the body 23 transversely thereof for sliding movement therealong, which mounting may be conveniently accomplished by bending the ends of the bars 25 around the side edges of the body 23, as may be seen in Fig. 3. Also secured to the body are a pair of supports or legs 26 to raise the body a suitable distance from its plane of support.

The crossbars 25 are interconnected by a plurality of connecting bars 27, which extend longitudinally of the body and cause all the bars 25 to move simultaneously. Actuation of the bars 25 is accomplished by a lever 28 pivotally mounted on the body at the location indicated by the numeral 30 in Fig. 2, and connected to one of the bars 25 by a link 31. The lever 28 extends beyond the side of the holder H and terminates in a finger engaging tab or handle 32.

Figure 2:
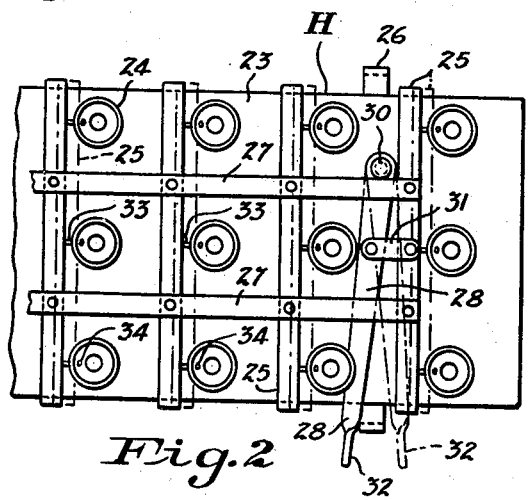
Fig. 2 is a fragmentary plan view with the confections removed, taken substantially on line 2—2 of Fig. 1.
Figure 4:
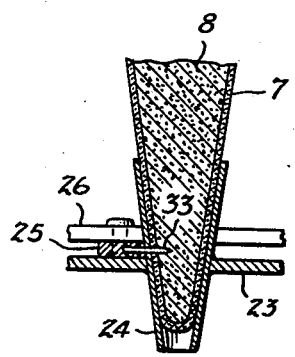
Fig. 4 is an enlarged fragmentary sectional view showing how the cone may be gripped by the rack.

Each of the bars 25 is disposed adjacent a row of the supports or sockets 24 and is provided with gripping means to hold the cones in the holder H with sufficient security so that the holder may be inverted. Fig. 4 shows a desirable form of gripping means, namely, a plurality of pins 33 secured to the bars 25, one for each of the sockets 24, said pins being extensible through apertures 34 disposed in each of the sockets 24 as shown in Fig. 2 to engage and firmly secure confections such as cake cones 7 filled with confection 8 and supported in the sockets. To assure that all the confections are securely gripped, it is desirable that the pins actually pierce the walls of the cones and project into the solidified comestible substance or confection 8 disposed therein, as illustrated in Fig. 4.

Figure 1:
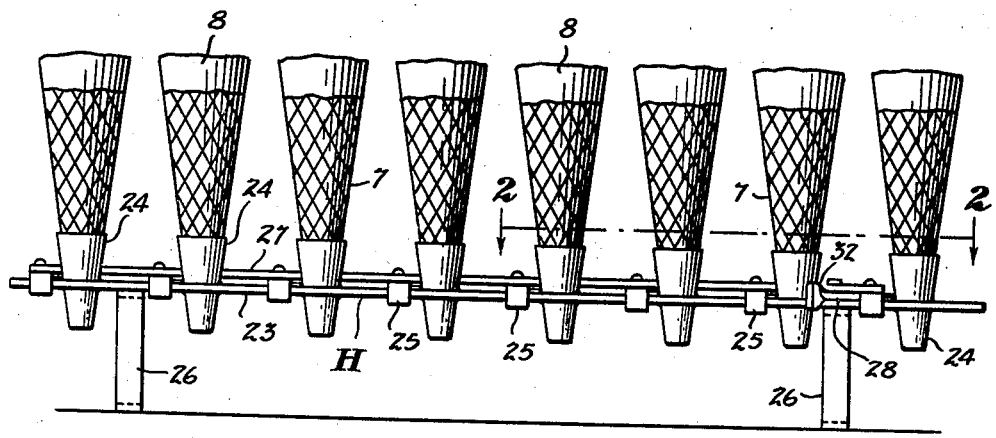
Figure 1 is a side elevational view, partially in section, of an assembly of frozen cones supported in my improved gripping and handling rack.

When the confections are placed in the holder H, as is the condition shown in Fig. 1, the tab or handle 32 is moved from its full line position in Fig. 2 to its dotted outline position of Fig. 2 to advance the bars 25 toward the sockets 24 and project the pins 33 through the apertures 34 into contact with the confections.

Figure 5:
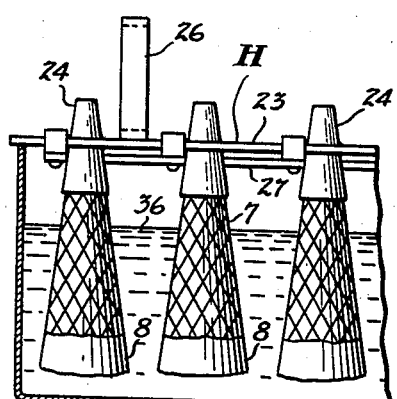
Fig. 5 is a fragmentary elevational view, partially in section, illustrating how the cones may be held by the device in inverted position and coated by dipping.

The holder H is lifted by its supports 26, which serve as handles, and inverted so that the confections may be held with the open ends of the containers directed downwardly. In this position the confections may be readily lowered into a suitable container, indicated by numeral 35 in Fig. 5, having therein an edible coating substance 36, such for example as melted chocolate. The coating may be applied by the above dipping process to cover only the solidified substance in the cone, or it may be used to coat as much of the cone as desired. One convenient way of coating the confections uniformly is by maintaining a constant level of the coating substance 36 in the container 35, and then positioning the holder H on the container 35 so that the edge portions of the body 23 rest on portions of the container, such as the top edges of the container walls.

After the confections have been coated with the substance 36, a layer of another edible substance may be applied thereto, such for example as fragments of nut meats or the like. The completed confection is placed in a suitable package and stored, preferably in a refrigerated compartment, ready to be dispensed to consumers. The holder H is removed by operating the lever 28 to release the confections for packaging.

It is evident from the foregoing description of this invention that the apparatus disclosed provides an economical and sanitary means of making frozen ice cream cones with a chocolate coating, which can be placed in a refrigerated compartment to be dispensed without the need of handling with unsanitary utensils and in unsanitary surroundings, and without the hands of a person coming in contact with any part of the frozen confection.

By means of the hereinbefore described apparatus, the handling of cones is much more rapid than any heretofore employed, so that the crisp, baked cones are prevented from becoming soggy.

By the herein described holder for simultaneously handling a large number of cones and by rapid freezing of the filling substance, it is not necessary to coat the inside and outside of the cone, although this may be done if desired. The elimination of this step, however, effects a substantial saving both in the use of materials and in the additional time needed for the dipping and handling operations.

This application is a division of my co-pending application Serial No. 392,083, filed May 6, 1941, for Method for forming coated frozen confections.

While the above apparatus has been described in connection with a specified confection, it may be seen that slight variations in the apparatus may be made to handle other similar confections without departing from the spirit of the present invention.

Although one embodiment of the invention has been herein illustrated and described, it will be evident to those skilled in the art that modifications may be made in the details of construction or in the steps of the method without departing from the principles herein set forth.

What I claim is:

1. Apparatus for handling ice cream cones having an open end and a closed end which comprises a relatively flat body member, a plurality of conically shaped supports to receive the closed ends of said cones and support the same, each support having a lateral aperture, a cone engaging pin associated with each support and movable transversely of the cone axis into the aperture of the support to engage and retain a cone in the support, and means for simultaneously actuating the engaging pins.

2. Apparatus for holding a plurality of confections which comprises a relatively flat body member, a plurality of supports on said member having sockets therein to receive and support confections, a lateral aperture in each of said supports communicating with the socket, a pin mounted for movement through each aperture into and out of the socket in a direction transversely of the axes of the confections to pierce the confection in the socket, and means for simultaneously actuating all of said pins to engage and disengage confections disposed in said supports.

3. Apparatus for holding a plurality of ice cream cones which comprises a relatively flat body member having a plurality of rows of conically shaped upright supporting members adapted to receive the lower ends of ice cream cones, each supporting member having an aperture in one side thereof, and a frame lying parallel with said body member closely adjacent thereto and having a cross bar adjacent each row of supporting members, each of said cross bars having a pin extending laterally therefrom toward each of said conical supports in the adjacent row and said frame being movable in its plane to simultaneously advance said pins into the apertures of said conical supports and into piercing engagement with ice cream cones supported in said conical supports.

FRANK SPORTOLARI.